(12) United States Patent
Takada et al.

(10) Patent No.: US 10,337,596 B2
(45) Date of Patent: Jul. 2, 2019

(54) LOCK-UP DEVICE FOR TORQUE CONVERTER

(71) Applicant: EXEDY Corporation, Neyagawa-shi, Osaka (JP)

(72) Inventors: Yukiyoshi Takada, Neyagawa (JP); Satoshi Osaki, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 15/552,173

(22) PCT Filed: Jan. 18, 2016

(86) PCT No.: PCT/JP2016/051218
§ 371 (c)(1),
(2) Date: Aug. 18, 2017

(87) PCT Pub. No.: WO2016/136325
PCT Pub. Date: Sep. 1, 2016

(65) Prior Publication Data
US 2018/0038465 A1 Feb. 8, 2018

(30) Foreign Application Priority Data
Feb. 23, 2015 (JP) .................................. 2015-032467

(51) Int. Cl.
*F16H 45/02* (2006.01)
*F16F 15/123* (2006.01)

(52) U.S. Cl.
CPC ....... *F16H 45/02* (2013.01); *F16F 15/12353* (2013.01); *F16F 15/12366* (2013.01);
(Continued)

(58) Field of Classification Search
CPC .............................................. F16H 2045/0231
See application file for complete search history.

(56) References Cited

U.S. PATENT DOCUMENTS 9,011,257 B2    4/2015  Kawahara et al.
2009/0139816 A1* 6/2009  Degler .................... F16H 45/02
                                                  192/3.29
(Continued)

FOREIGN PATENT DOCUMENTS

CN    201106670 Y    8/2008
CN    101305214 A    11/2008
(Continued)

OTHER PUBLICATIONS

International Search Report dated Mar. 29, 2016 for corresponding foreign Application No. PCT/JP2016/051218, 2 pp.
(Continued)

*Primary Examiner* — Mark A Manley
(74) *Attorney, Agent, or Firm* — United IP Counselors, LLC (57) ABSTRACT

A lock-up device includes a clutch part, an input plate, an outer peripheral side damper part, an output plate, an inner peripheral side damper part, and an intermediate member. The outer peripheral side damper part includes at least two outer peripheral side springs. The outer peripheral side springs are disposed in a circumferential alignment, act in series, and take circular-arc shapes when in a free state. The inner peripheral side damper part includes at least two inner peripheral side springs. The inner peripheral side springs are disposed in a circumferential alignment on an inner peripheral side of the outer peripheral side damper part, and act in series. The intermediate member is rotatable relatively to the input plate and the output plate, and makes the outer peripheral side damper part and the inner peripheral side damper part act in series.

8 Claims, 5 Drawing Sheets

(52) U.S. Cl.
CPC ............... *F16H 2045/0205* (2013.01); *F16H 2045/0226* (2013.01); *F16H 2045/0231* (2013.01); *F16H 2045/0278* (2013.01)

(56) References Cited

U.S. PATENT DOCUMENTS

| | | | | |
|---|---|---|---|---|
| 2012/0208647 | A1* | 8/2012 | Takikawa | F16H 45/02 464/68.8 |
| 2012/0252587 | A1* | 10/2012 | Takikawa | F16H 45/02 464/68.8 |
| 2015/0184719 | A1 | 7/2015 | Yuki et al. | |
| 2015/0184720 | A1 | 7/2015 | Yuki et al. | |

FOREIGN PATENT DOCUMENTS

| | | | |
|---|---|---|---|
| CN | 102112775 | A | 6/2011 |
| CN | 103201538 | A | 7/2013 |
| CN | 203703044 | U | 7/2014 |
| DE | 112011103759 | T5 | 11/2013 |
| JP | S56-94049 | A | 7/1981 |
| JP | H10-220555 | A | 8/1998 |
| JP | 2004156692 | A | 6/2004 |
| JP | 2008256017 | A | 10/2008 |
| JP | 2009-156270 | A | 7/2009 |
| JP | 2009250288 | A | 10/2009 |
| JP | 2011122640 | A | 6/2011 |
| JP | 2011179557 | A | 9/2011 |
| JP | 2012122584 | A | 6/2012 |
| WO | 2012063586 | A1 | 5/2012 |

OTHER PUBLICATIONS

Notification of Reasons for Refusal of the corresponding Japanese patent application No. 2015-032467, dated May 22, 2018, 11 pp.
First Office Action of the corresponding Chinese patent application No. 201680009241.X, dated Jan. 23, 2019, 7 pp.
Notification of Reasons for Refusal of the corresponding Japanese patent application No. 2015-032467, dated Dec. 11, 2018.

* cited by examiner

LOCK-UP DEVICE FOR TORQUE CONVERTER

CROSS-REFERENCE TO RELATED APPLICATIONS

This application is the U.S. National Phase of PCT International Application No. PCT/JP2016/051218, filed on Jan. 18, 2016. That application claims priority to Japanese Patent Application No. 2015-032467, filed Feb. 23, 2015. The contents of both applications are herein incorporated by reference in their entirety.

BACKGROUND

Technical Field

The present disclosure relates to a lock-up device, particularly to a lock-up device for a torque converter, which is disposed between a front cover coupled to an engine-side member and a turbine of the torque converter.

Background Information

As described in Japan Laid-open Patent Application Publication No. 2011-122640 and Japan Laid-open Patent Application Publication No. 2009-250288, torque converters are often equipped with a lock-up device that directly transmits a torque from a front cover to a turbine. The lock-up devices described in these patent literatures includes a piston, an input-side plate, a plurality of torsion springs and an output-side plate. The piston is capable of being coupled by friction to the front cover. The input-side plate is fixed to the piston. The torsion springs are provided on an outer peripheral side and an inner peripheral side in a radial direction. The output-side plate transmits the torque, transmitted thereto through the plural torsion springs, to the turbine.

BRIEF SUMMARY

In this type of lock-up device, it is required to achieve lowering of stiffness and widening of torsion angle in torsional characteristics in order to enhance vibration absorbing performance.

It is an object of the present disclosure to provide a lock-up device for a torque converter in which lowering of stiffness and widening of torsion angle in torsional characteristics can be achieved with a simple configuration.

(1) A lock-up device for a torque converter according to an aspect of the present disclosure is disposed between a front cover to be coupled to an engine-side member and a turbine of the torque converter. The lock-up device includes a clutch part, an input plate, an outer peripheral side damper part, an output plate, an inner peripheral side damper part and an intermediate member. The clutch part is a constituent element to which a torque is inputted from the front cover. The input plate is coupled to the clutch part. The outer peripheral side damper part is a constituent element to which the torque is transmitted from the input plate, and includes at least two outer peripheral side springs. The at least two outer peripheral side springs are disposed in circumferential alignment and act in series. Each of the at least two outer peripheral side springs takes a circular-arc shape in a free state thereof. The output plate is coupled to the turbine. The inner peripheral side damper part transmits the torque to the output plate, and includes at least two inner peripheral side springs. The at least two inner peripheral side springs are disposed in circumferential alignment on an inner peripheral side of the outer peripheral side damper part, and act in series. The intermediate member is rotatable relatively to the input plate and the output plate, and makes the outer peripheral side damper part and the inner peripheral side damper part act in series.

In the present device, a torque inputted thereto from the front cover is inputted into the input plate through the clutch part, and is transmitted from the input plate to the inner peripheral side damper part through the outer peripheral side damper part and the intermediate member. The torque transmitted to the inner peripheral side damper part is outputted to the turbine through the output plate.

Here, in each of the outer peripheral side damper part and the inner peripheral side damper part, at least two springs are configured to act in series. Additionally, the outer peripheral side damper part and the inner peripheral side damper part act in series. Therefore, it is possible to achieve lowering of stiffness and widening of torsion angle in torsional characteristics. In addition, arc springs, each of which takes a circular-arc shape in a free state thereof, are employed as the outer peripheral side springs. Hence, it is possible to achieve further lowering of stiffness and further widening of torsion angle in torsional characteristics.

(2) In a lock-up device for a torque converter according to another aspect of the present disclosure, the at least two outer peripheral side springs acting in series are directly contacted at circumferential end surfaces thereof.

Here, adjacent springs are directly contacted to each other. Hence, each spring can be elongated as much as possible. Therefore, torsion angle in torsional characteristics can be widened as much as possible.

(3) A lock-up device for a torque converter according to yet another aspect of the present disclosure further includes a float member. The float member is rotatable relatively to the input plate, the output plate and the intermediate member, and makes at least two of the plural inner peripheral side springs act in series.

(4) In a lock-up device for a torque converter according to yet another aspect of the present disclosure, the at least two outer peripheral side springs acting in series have different magnitudes of stiffness.

(5) In a lock-up device for a torque converter according to yet another aspect of the present disclosure, among the at least two outer peripheral side springs acting in series, at least one outer peripheral side spring with lowest stiffness is compressed such that windings thereof are closely contacted to each other when a relative rotational angle between the input plate and the output plate is greater than or equal to a predetermined angle.

With the configuration described above, the outer peripheral side damper part can be set to have multi-stage characteristics without being particularly provided with a stopper mechanism.

(6) In a lock-up device for a torque converter according to yet another aspect of the present disclosure, each of the at least two inner peripheral side springs takes a straight shape in a free state thereof.

Here, a relatively small hysteresis torque can be produced in the inner peripheral side damper part. Therefore, vibration can be attenuated as effectively as possible.

(7) A lock-up device for a torque converter according to yet another aspect of the present disclosure further includes a stopper mechanism restricting the relative rotational angle between the input plate and the output plate.

(8) In a lock-up device for a torque converter according to yet another aspect of the present disclosure, the stopper mechanism includes a pawl and an opening. The pawl is provided on one of the input plate and the output plate. The opening is a constituent element into which the pawl is inserted, and is circumferentially provided in the other of the input plate and the output plate.

As described above, according to the present disclosure, lowering of stiffness and widening of torsion angle in torsional characteristics can be achieved with a simple configuration in a lock-up device.

DETAILED DESCRIPTION OF EMBODIMENTS

Entire Configuration

Figure 1:
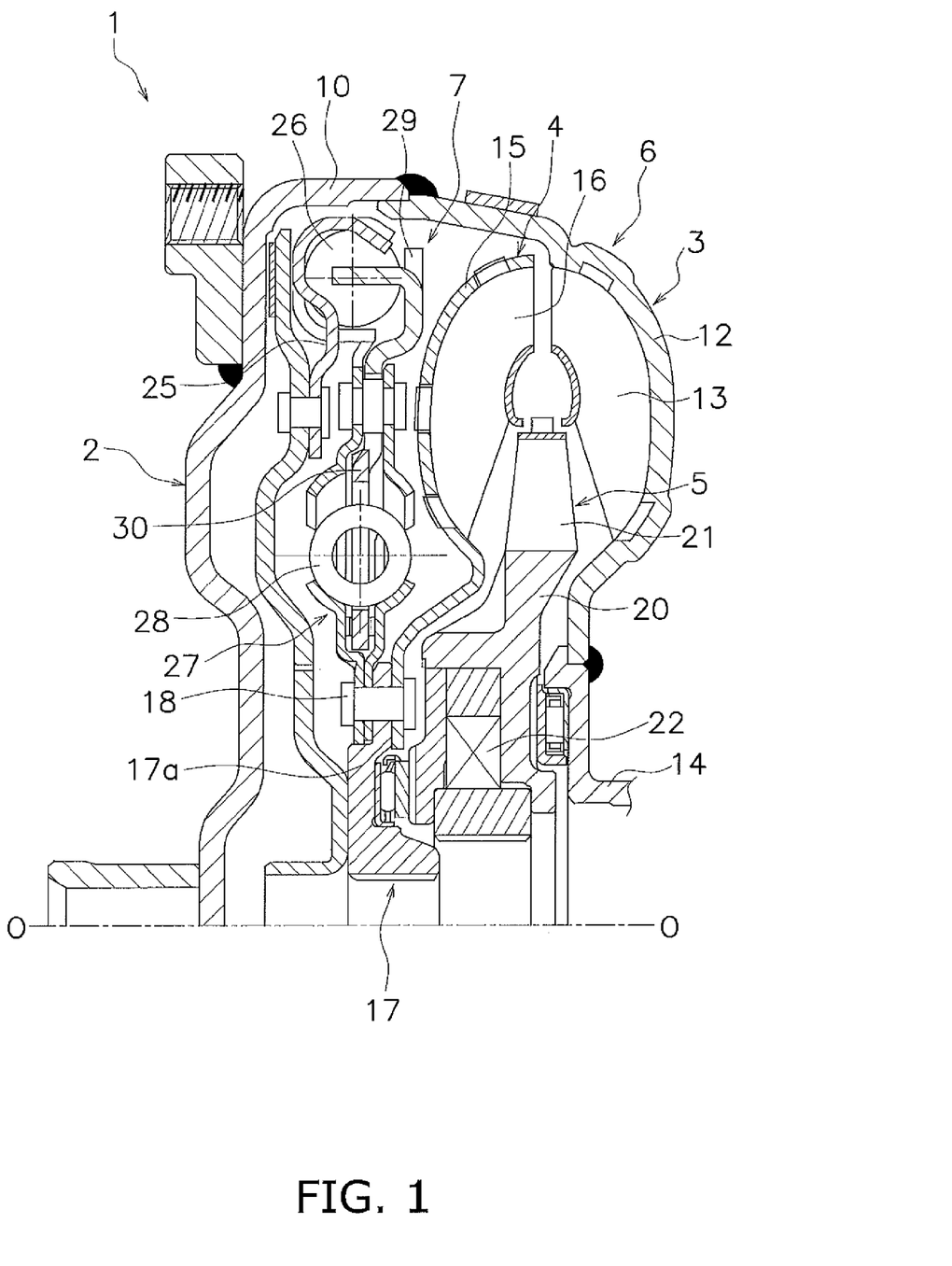
FIG. 1 is a cross-sectional configuration diagram of a torque converter according to an exemplary embodiment of the present disclosure.

FIG. 1 shows a torque converter 1 according to an exemplary embodiment of the present disclosure. In FIG. 1, an engine is disposed on the left side, whereas a transmission is disposed on the right side. Line O-O depicted in FIG. 1 is a rotational axis of the torque converter.

The torque converter 1 is a device that transmits a torque from an engine-side crankshaft (not shown in the drawings) to an input shaft of the transmission, and is composed of a front cover 2 fixed to an engine-side member, a torque converter body 6 composed of three types of bladed wheels (an impeller 3, a turbine 4 and a stator 5), and a lock-up device 7.

The front cover 2 is a disc-shaped member and includes an outer peripheral tubular part 10 in the outer peripheral part thereof. The outer peripheral tubular part 10 protrudes toward the transmission. The impeller 3 is composed of an impeller shell 12, a plurality of impeller blades 13 and an impeller hub 14. The impeller shell 12 is fixed to the outer peripheral tubular part 10 of the front cover 2 by welding. The impeller blades 13 are fixed to the inside of the impeller shell 12. The impeller hub 14 has a tubular shape and is provided on the inner peripheral side of the impeller shell 12.

The turbine 4 is disposed in opposition to the impeller 3 within a fluid chamber. The turbine 4 is composed of a turbine shell 15, a plurality of turbine blades 16 fixed to the turbine shell 15, and a turbine hub 17 fixed to the inner peripheral side of the turbine shell 15. The turbine hub 17 includes a flange 17a extending to the outer peripheral side. The inner peripheral part of the turbine shell 15 is fixed to the flange 17a by a plurality of rivets 18. Additionally, the input shaft of the transmission (not shown in the drawings) is spline-coupled to the inner peripheral part of the turbine hub 17.

The stator 5 is a mechanism disposed between the inner peripheral part of the impeller 3 and that of the turbine 4 so as to regulate the flow of hydraulic oil returning from the turbine 4 to the impeller 3. The stator 5 is mainly composed of a stator carrier 20 and a plurality of stator blades 21 provided on the outer peripheral surface of the stator carrier 20. The stator carrier 20 is supported by a stationary shaft (not shown in the drawings) through a one-way clutch 22.

Entire Configuration of Lock-up Device 7

Figure 2:
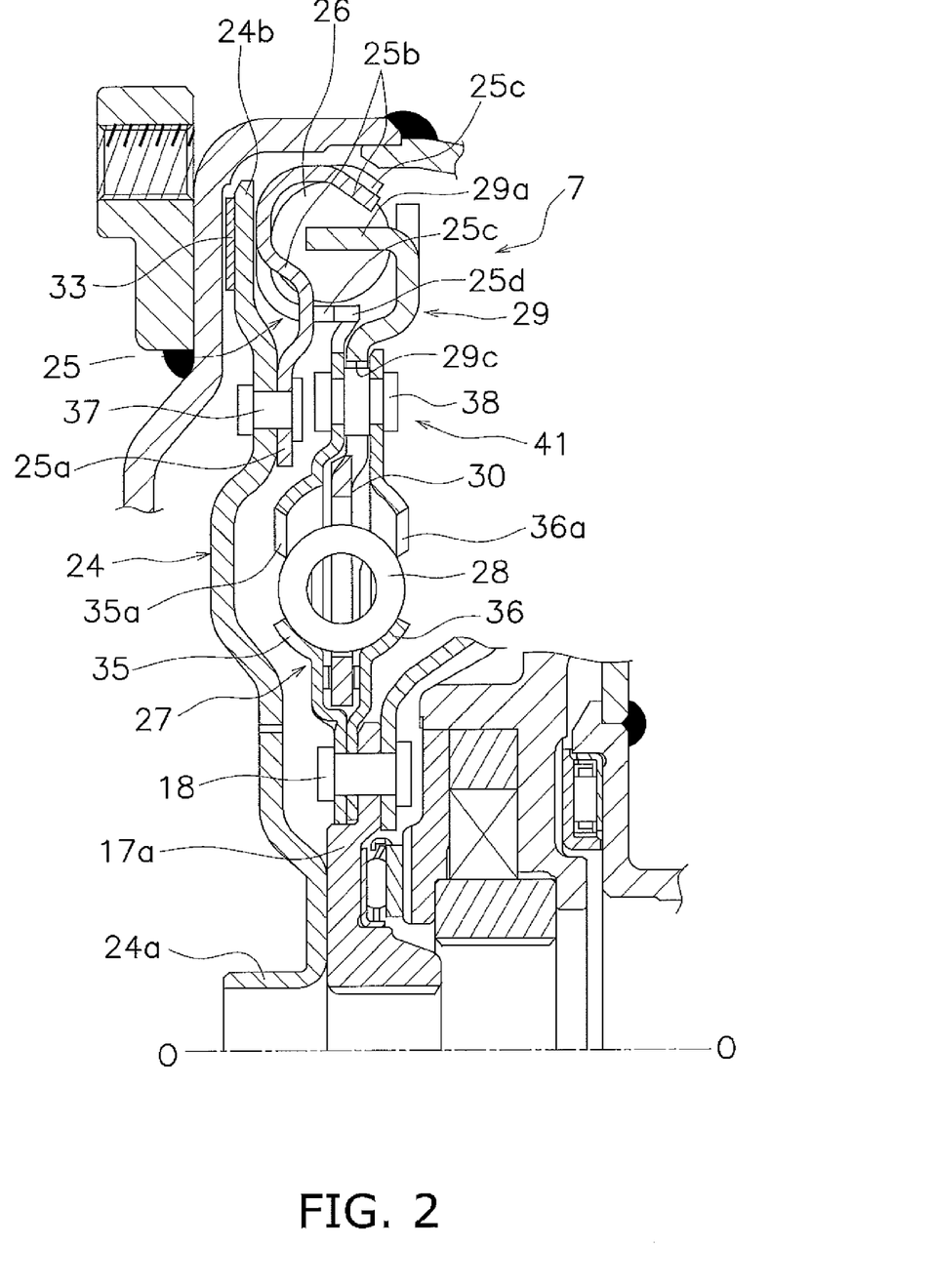
FIG. 2 is a diagram showing a lock-up device extracted from FIG. 1.

FIG. 2 shows the lock-up device 7 extracted from FIG. 1. The lock-up device 7 is disposed between the front cover 2 and the turbine 4. The lock-up device 7 includes a piston 24, a drive plate 25 (input plate), a plurality of outer peripheral side torsion springs 26 (outer peripheral side damper part), a driven plate 27 (output plate), a plurality of inner peripheral side torsion springs 28 (inner peripheral side damper part), an intermediate member 29 and a float member 30.

Piston 24

The piston 24 is a disc-shaped plate and is disposed on the transmission side of the front cover 2. The piston 24 includes a tubular part 24a on the inner peripheral end thereof. The tubular part 24a extends to the engine side. The tubular part 24a is supported by the outer peripheral surface of a transmission-side member (not shown in the drawings) so as to be axially movable and be rotatable relatively thereto. Additionally, the piston 24 includes a flat part 24b in the outer peripheral part thereof. A friction member 33, having an annular shape, is fixed to the front cover 2-side surface of the flat part 24b. When the friction member 33 is pressed onto the front cover 2, a torque is transmitted from the front cover 2 to the piston 24. In other words, the piston 24 and the friction member 33 compose a clutch part.

Drive Plate 25

The drive plate 25 is fixed to the transmission-side lateral surface of the outer peripheral part of the piston 24. Specifically, the drive plate 25 has a disc shape and is fixed at an inner peripheral part 25a thereof to the transmission-side surface of the piston 24 by rivets 37.

Figure 3:
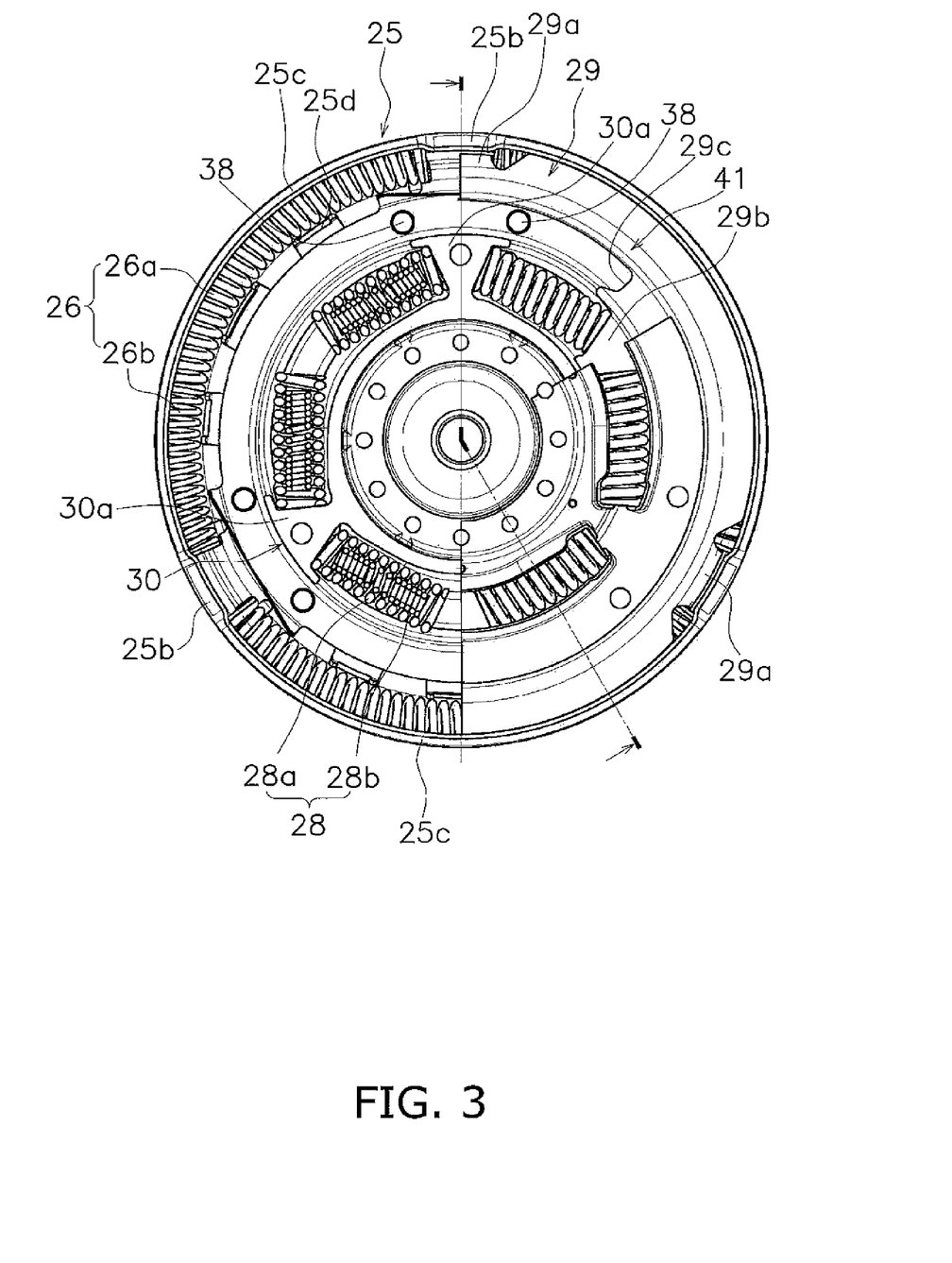
FIG. 3 is a partial front view of the lock-up device.

FIG. 3 is a view of the drive plate 25, the outer peripheral side torsion springs 26 (26a, 26b), the inner peripheral side torsion springs 28 (28a, 28b), the intermediate member 29 and the float member 30 as seen from the transmission side. FIG. 3 shows a condition that the other members excluding the aforementioned members are removed.

As shown in FIGS. 2 and 3, the drive plate 25 includes a plurality of engaging parts 25b in the outer peripheral part thereof. Each engaging part 25b includes a part formed by stamping an intermediate part of the drive plate 25 to the transmission side and a part formed by bending the outer peripheral end of the drive plate 21 to the transmission side and the inner peripheral side. The engaging parts 25b are engaged with both circumferential ends of the outer peripheral side torsion springs 26.

As shown in FIG. 3, the drive plate 25 includes spring support parts 25c in the other regions thereof excluding the regions thereof including the engaging parts 25b. The spring support parts 25c are formed by bending the outer peripheral part and the radially intermediate part of the drive plate 25 to the transmission side, and supports the outer peripheral side torsion springs 26 from the outer peripheral side and the inner peripheral side.

It should be noted that part of each spring support part 25c, supporting each outer peripheral side torsion spring 26 from the inner peripheral side, includes a plurality of stopper pawls 25d (to be described in detail) protruding from the distal ends (transmission-side distal ends) of the spring support parts 25c to the further transmission side.

Outer Peripheral Side Torsion Springs 26

The outer peripheral side torsion springs 26 include a plurality of first outer peripheral side springs 26a and a plurality of second outer peripheral side springs 26b, which are disposed in circumferential alignment. Each first outer peripheral side spring 26a has a relatively long spring length, whereas each second outer peripheral side spring 26b has a spring length that is about one-third of the spring length of each first outer peripheral side spring 26a. Each first outer peripheral side spring 26a has a lower stiffness than each second outer peripheral side spring 26b. Additionally, the first and second outer peripheral side springs 26a and 26b are so-called arc springs, each of which takes a circular-arc shape when in a free state thereof without being assembled in the lock-up device 7. In other words, FIG. 3 shows a condition that each outer peripheral side torsion spring 26 is supported by each spring support part 25c of the drive plate 25. When in the free state without being supported by each spring support part 25c, each outer peripheral side torsion spring 26 also takes the same posture as that shown in FIG. 3.

Each pair of the first outer peripheral side spring 26a and the second outer peripheral side spring 26b is disposed to act in series. In other words, one circumferential end surface of the first outer peripheral side spring 26a makes contact with one of the engaging parts 25b of the drive plate 25, whereas the other circumferential end surface thereof makes contact with one end surface of the second outer peripheral side spring 26b. On the other hand, the other circumferential end surface of the second outer peripheral side spring 26b makes contact with another of the engaging parts 25b of the drive plate 25. In other words, the first outer peripheral side spring 26a and the second outer peripheral side spring 26b directly makes contact with each other.

It should be noted that arc springs are herein provided as the first and second outer peripheral side springs 26a and 26b. Hence, when actuated, these springs 26a and 26b relatively strongly make contact with the outer peripheral side parts of the spring support parts 25c of the drive plate 25. Therefore, a relatively large hysteresis torque is produced between the first and second outer peripheral side springs 26a and 26b and the drive plate 25.

Driven Plate 27

The driven plate 27 includes a first plate 35 disposed on the engine side and a second plate 36 disposed on the transmission side. Each of the first plate 35 and the second plate 36 has a disc shape.

The inner peripheral parts of the first and second plates 35 and 36 are fixed to the flange 17a of the turbine hub 17 by the rivets 18. On the other hand, the outer peripheral parts of both plates 35 and 36 are fixed at a predetermined axial interval by stop pins 38. In other words, the first plate 35 and the second plate 36, except for the inner peripheral parts thereof fixed to each other, are disposed in opposition at an axial interval. Both plates 35 and 36 are herein non-rotatable relatively to the turbine hub 17 and are axially immovable.

The first plate 35 and the second plate 36 include windows 35a and windows 36a in the radially intermediate parts thereof, respectively. The outer peripheral edge and the inner peripheral edge of each window 35a, 36a are cut and raised axially outside. The inner peripheral side torsion springs 28 are restricted from moving in the axial direction and the radial direction by the windows 35a and 36a.

It should be noted that each window 35a, 36a has a circular-arc outer peripheral shape more bulging to the outer peripheral side than a circular-arc shape formed by the outer periphery of each inner peripheral side torsion spring 28 when each inner peripheral side torsion spring 28 is set in place and is actuated. Therefore, when each inner peripheral side torsion spring 28 is actuated, the outer periphery thereof and the windows 35a and 36a are unlikely to side against each other. Due to this, a small hysteresis torque is produced between each inner peripheral side torsion spring 28 and both plates 35 and 36.

Intermediate Member 29

The intermediate member 29 is disposed axially between the drive plate 25 and the turbine 4, and is rotatable relatively to the drive plate 25 and the driven plate 27. As shown in FIG. 3, the intermediate member 29 is an annular-shaped member and includes a plurality of outer peripheral side engaging parts 29a and a plurality of inner peripheral side engaging parts 29b.

The outer peripheral side engaging parts 29a are provided on the outer peripheral end of the intermediate member 29 while being circumferentially aligned at predetermined intervals. The outer peripheral side engaging parts 29a are formed by bending the outer peripheral end of the intermediate member 29 to the engine side. Each outer peripheral side engaging part 29a is disposed between adjacent two sets of the outer peripheral side torsion springs 26, and is engaged with a one-side end surface of the first outer peripheral side spring 26a in one of the adjacent two sets of the outer peripheral side torsion springs 26 and an other-side end surface of the second outer peripheral side spring 26b in the other of the adjacent two sets of the outer peripheral side torsion springs 26.

The inner peripheral side engaging parts 29b are provided on the inner peripheral end of the intermediate member 29 while being circumferentially aligned at predetermined intervals. The inner peripheral side engaging parts 29b are formed by protruding the inner peripheral end of the intermediate member 29 to the further inner peripheral side, and each is provided circumferentially between two outer peripheral side engaging parts 29a. Moreover, the inner peripheral side engaging parts 29b are disposed axially between the first and second plates 35 and 36 of the driven plate 27.

With the intermediate member 29 described above, the outer peripheral side torsion springs 26 and the inner peripheral side torsion springs 28 are configured to act in series.

Float Member 30

The float member 30 is disposed on the inner peripheral side of the intermediate member 29 while being disposed axially between the first plate 35 and the second plate 36. The float member 30 is rotatable relatively to the drive plate 25, the intermediate member 29 and the driven plate 27. As shown in FIG. 3, the float member 30 is an annular-shaped member and includes a plurality of engaging parts 30a that are provided on the outer peripheral end thereof so as to protrude to the outer peripheral side.

Each engaging part 30a is disposed circumferentially between adjacent two of the inner peripheral side engaging parts 29b of the intermediate member 29. Additionally, each engaging part 30a is disposed between adjacent two of the inner peripheral side torsion springs 28.

Inner Peripheral Side Torsion Springs 28

Each inner peripheral side torsion spring 28 includes a first inner peripheral side spring 28a and a second inner peripheral side spring 28b disposed inside the first inner peripheral side spring 28a. The second inner peripheral side spring 28b has a shorter spring length than the first inner peripheral side spring 28a.

As described above, each window 35a, 36a of each of the first and second plates 35 and 36 has a circular-arc outer peripheral shape more bulging to the outer peripheral side than the circular-arc shape formed by the outer periphery of each first inner peripheral side spring 28a when each inner peripheral side torsion spring 28a is actuated. Additionally, each of the first and second inner peripheral side springs 28a and 28b takes a straight shape when in a free state thereof without being assembled in the lock-up device 7. With the configuration described above, it is possible to further reduce the hysteresis torque to be generated between each first inner peripheral side spring 28a and both plates 35 and 36.

Among six sets of the inner peripheral side torsion springs 28, two sets of the inner peripheral side torsion springs 28, interposed between two of the inner peripheral side engaging parts 29b of the intermediate member 29, are configured to act in series due to the float member 30.

Stopper Mechanisms

Figure 4:
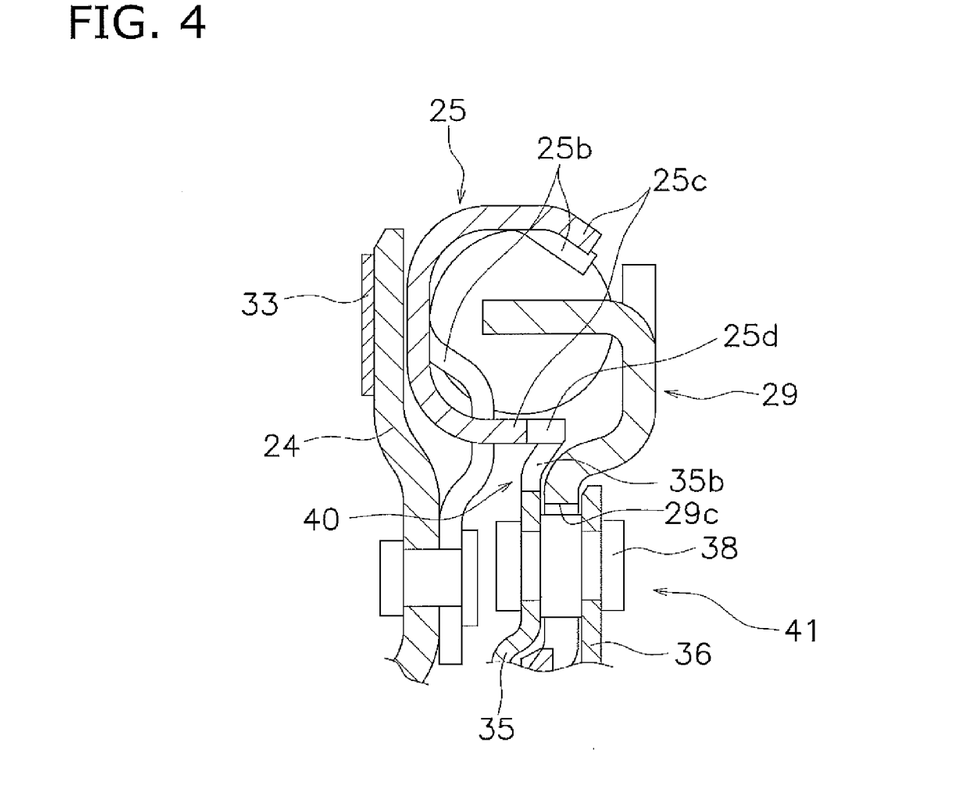
FIG. 4 is a cross-sectional configuration diagram of a stopper mechanism.
Figure 5:
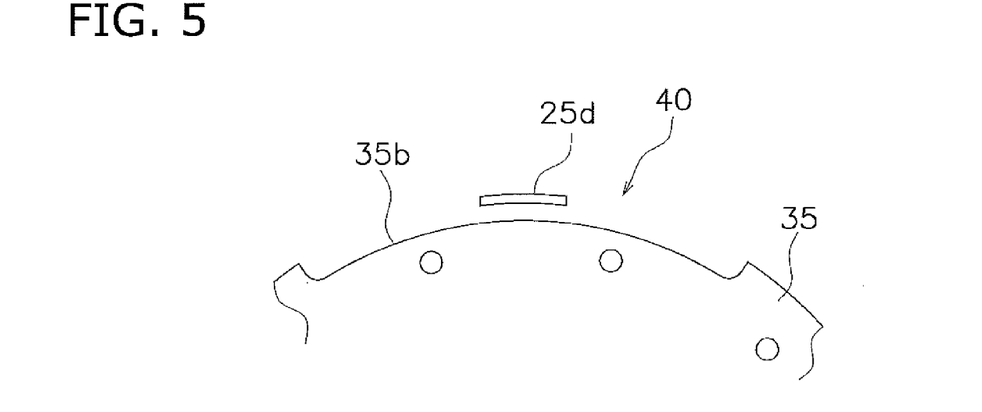
FIG. 5 is a partial front view of the stopper mechanism.

The lock-up device 7 includes a first stopper mechanism 40 and a second stopper mechanism 41. The first stopper mechanism 40 restricts a relative rotational angle between the drive plate 25 and the driven plate 27. As shown in FIGS. 4 and 5, the first stopper mechanism 40 is composed of the stopper pawls 25d provided on part of the drive plate 25 and cutouts 35b provided on the outer peripheral end of the first plate 35 of the driven plate 27. The second stopper mechanism 41 restricts a relative rotational angle between the intermediate member 29 and the driven plate 27. As shown in FIGS. 2 to 4, the second stopper mechanism 41 is composed of circumferentially elongated cutouts 29c included in the intermediate member 29 and the stop pins 38 coupling both plates 35 and 36 of the driven plate 27.

As shown close-up in FIG. 4, each stopper pawl 25d is formed by extending part of each spring support part 25c of the drive plate 25 to the transmission side. Specifically, each spring support part 25c does not axially overlap the first plate 35, but each stopper pawl 25d extends to a position axially overlapping the first plate 35.

FIG. 5 shows a front view of the first stopper mechanism 40. As is obvious from FIG. 5, each cutout 35b is provided on the outer peripheral edge of the first plate 35 so as to open to the outer peripheral side. Each cutout 35b is provided in a predetermined angular range, and each stopper pawl 25d is inserted into the interior of each cutout 35b.

With the configuration described above, the drive plate 25 is rotatable relatively to the driven plate 27 until each stopper pawl 25d makes contact with one of the circumferential ends of each cutout 35b. In other words, rotation of the drive plate 25 relative to the driven plate 27 is prevented by the contact of each stopper pawl 25d with one of the end surfaces of each cutout 35b.

Actions

In a clutch-off state that the lock-up device 7 is not being actuated, a torque from the engine is transmitted from the front cover 2 to the impeller 3. Hydraulic oil, driven by the impeller blades 13 of the impeller 3, rotates the turbine 4. The torque of the turbine 4 is transmitted to the input shaft of the transmission (not shown in the drawings) through the turbine hub 17.

When the velocity of a vehicle becomes a predetermined value or greater, the piston 24 is moved toward the front cover 2, and the friction member 33 is pressed onto the friction surface of the front cover 2. Accordingly, a clutch-on state is made, and the torque from the front cover 2 is transmitted from the piston 24 to the outer peripheral side torsion springs 26 through the drive plate 25. The torque, transmitted to the outer peripheral side torsion springs 26, is transmitted to the inner peripheral side torsion springs 28 through the intermediate member 29. The torque, transmitted to the inner peripheral side torsion springs 28, is transmitted to the turbine hub 17 through the driven plate 27.

In transmission of power as described above, each pair of the first outer peripheral side spring 26a and the second outer peripheral side spring 26b acts in series. Additionally, each pair of the (two) inner peripheral side torsion springs 28 also acts in series due to the float member 30. Moreover, the outer peripheral side torsion springs 26 and the inner peripheral side torsion springs 28 act in series due to the intermediate member 29. Therefore, lowering of stiffness and widening of torsion angle in torsional characteristics can be achieved.

Figure 6:
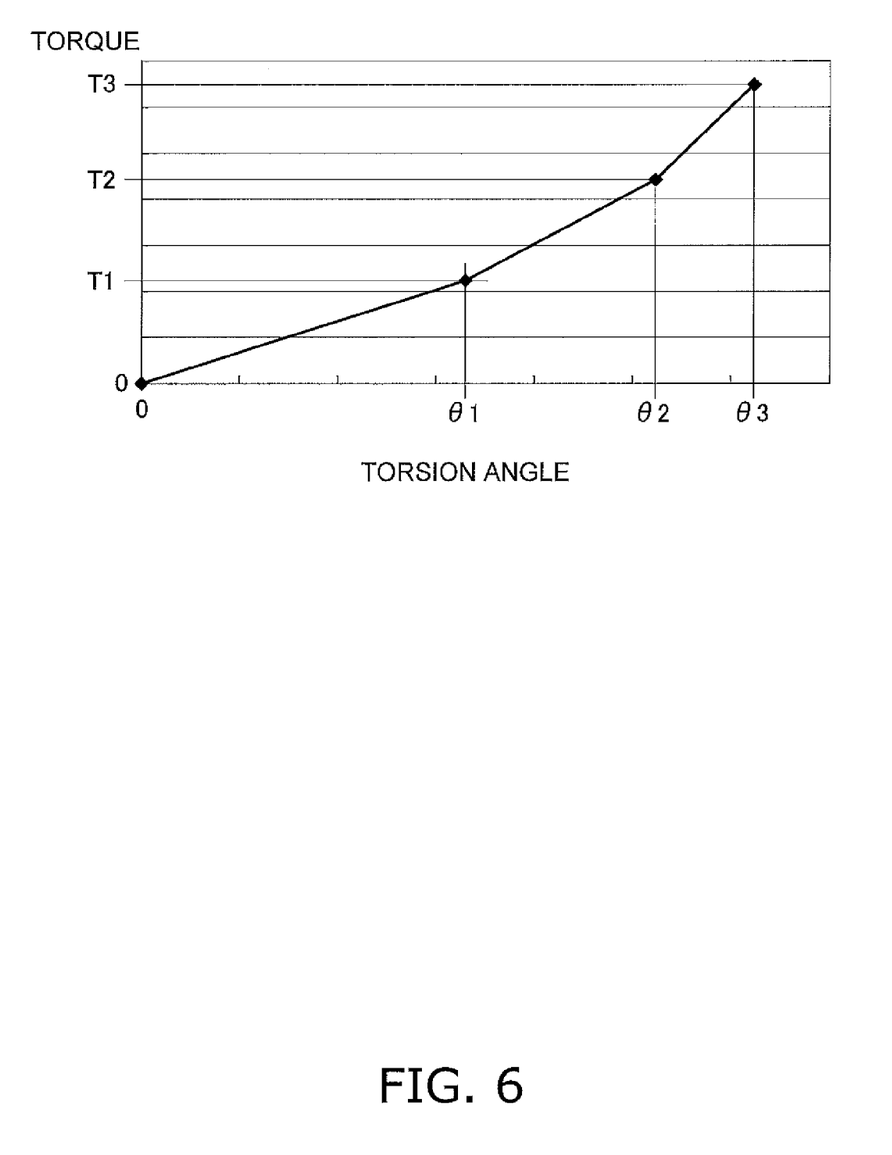
FIG. 6 is a diagram showing torsional characteristics of the lock-up device according to the exemplary embodiment of the present disclosure.

FIG. 6 shows torsional characteristics. As shown in FIG. 6, while a torque to be inputted is in a range of 0 to T1 (first stage), the relative rotational angle between the drive plate 25 and the driven plate 27, in other words, a torsion angle is in a range of 0 to $\theta 1$. In this torsion angular range, the first and second outer peripheral side springs 26a and 26b and the first inner peripheral side springs 28a are compressed, and a torsional characteristic with lowest stiffness is obtained.

When the torque to be inputted becomes T1 and the torsion angle becomes $\theta 1$, each first outer peripheral side spring 26a with lowest stiffness is compressed such that windings thereof are closely contacted to each other. Therefore, when the torque to be inputted exceeds T1 and the torsion angle becomes $\theta 1$ or greater (second stage), each second outer peripheral side spring 26b with high stiffness and each first inner peripheral side spring 28a are actuated. Accordingly, in a torsion angular range of $\theta 1$ to $\theta 2$, a torsional characteristic with higher stiffness (medium stiffness) is obtained.

When the torque to be inputted further increases and the torsion angle becomes $\theta 2$, each first inner peripheral side spring 28a is compressed until the length thereof becomes equal to that of each second inner peripheral side spring 28b. Therefore, when the torque to be inputted exceeds T2 and the torsion angle becomes $\theta 2$ or greater (third stage), not only each second outer peripheral side spring 26b and each first inner peripheral side spring 28a but also each second inner peripheral side spring 28b are also actuated. Accordingly, in a torsion angular range of $\theta 2$ or greater, a torsional characteristic with highest stiffness (high stiffness) is obtained.

It should be noted that when the torsion angle becomes $\theta 3$, the first stopper mechanism 40 is actuated. In other words, each stopper pawl 25d of the drive plate 25 is contacted to one of the end surfaces of each cutout 35b of the driven plate 27, whereby relative rotation between the drive plate 25 and the driven plate 27 is prevented. Additionally, in this exemplary embodiment, the second stopper mechanism 41 is also actuated simultaneously with the first stopper mechanism 40. In other words, the stop pins 38 are contacted to the end surfaces of the cutouts 29c of the intermediate member 29, whereby relative rotation between the intermediate member 29 and the driven plate 27 is prevented.

It should be noted that the aforementioned actuations of the respective springs are exemplary only, and for example, it is also possible to actuate the respective springs as follows.

In short, similarly to the aforementioned example, in the first stage, the first and second outer peripheral side springs 26a and 26b are set to be compressed. In this case, the torsional characteristic with lowest stiffness is obtained. Next in the second stage, not only the respective springs 26a and 26b in the first stage but also the second inner peripheral side springs 28b are set to be compressed. In this case, the torsional characteristic with medium stiffness is obtained. Then in the third stage, each first outer peripheral side spring 28a is compressed such that windings thereof are fully contacted to each other, whereas the remaining springs 26b, 28a and 28b are actuated. In this case, the torsional characteristic with high stiffness is obtained.

Features (1) The first and second outer peripheral side springs 26a and 26b have circular-arc shapes. Hence, lowering of stiffness and widening of torsion angle in torsional characteristics can be achieved. Additionally, the outer peripheral side torsion springs 26 and the inner peripheral side torsion springs 28 act in series due to the intermediate member 29. Moreover, each pair of the outer peripheral side springs 26a and 26b acts in series, and pairs of the inner peripheral side springs 28a and 28b act in series. Hence, further widening of torsion angle can be achieved.

(2) A large hysteresis torque can be generated between the outer peripheral side torsion springs 26 and the drive plate 25, whereas a small hysteresis torque can be generated between the inner peripheral side torsion springs 28 and the first and second plates 35 and 36. Additionally, each outer peripheral side torsion spring 26 can be set to have high stiffness, whereas each inner peripheral side torsion spring 28 can be set to have low stiffness.

Therefore, the torsional characteristic with high stiffness and high hysteresis torque can be exerted in the outer peripheral side damper part. Hence, when an excessive torque is suddenly inputted, sound and vibration can be effectively absorbed. On the other hand, the torsional characteristic with low stiffness and low hysteresis torque can be exerted in the inner peripheral side damper part. Hence, this advantageously copes with booming sound at a low engine speed.

Other Exemplary Embodiments

The present disclosure is not limited to the aforementioned exemplary embodiment, and a variety of changes or modifications can be made without departing from the scope of the present disclosure.

(a) In the aforementioned exemplary embodiment, the friction member is provided on the front cover-side surface of the piston. However, the present disclosure is similarly applicable to a device that is provided with a clutch part composed of a plurality of friction members so as to transmit a torque from a front cover to torsion springs through the clutch part.

(b) The stiffness and the number of springs in each of the outer peripheral side and inner peripheral side damper parts can be arbitrarily set, and are not limited to those in the aforementioned exemplary embodiment.

INDUSTRIAL APPLICABILITY

As described above, according to the present disclosure, lowering of stiffness and widening of torsion angle in torsional characteristics can be achieved with a simple configuration in a lock-up device.

REFERENCE SIGNS LIST

1 Torque converter
2 Front cover
3 Impeller
4 Turbine
7 Lock-up device
24 Piston
25 Drive plate (Input plate)
25b Engaging part
25d Stopper pawl
26 Outer peripheral side torsion spring (outer peripheral side damper part)
27 Driven plate (output plate)
28 Inner peripheral side torsion spring (inner peripheral side damper part)
29 Intermediate member
30 Float member
33 Friction member
40 First Stopper mechanism

The invention claimed is:

1. A lock-up device for a torque converter, the lock-up device disposed between a front cover to be coupled to an engine-side member and a turbine of the torque converter, the lock-up device comprising:
 a clutch part to which a torque is inputted from the front cover;
 an input plate coupled to the clutch part;
 an outer peripheral side damper part to which the torque is transmitted from the input plate, the outer peripheral side damper part including at least two outer peripheral side springs, the at least two outer peripheral side springs disposed in a circumferential alignment, the at least two outer peripheral side springs for acting in series with each other, each of the at least two outer peripheral side springs taking a circular-arc shape in a free state thereof, wherein the at least two outer peripheral side springs are directly contacted at circumferential end surfaces thereof, and the free state is defined as a state without being assembled with the lock-up device;
 an output plate coupled to the turbine, the output plate including a first output plate and a second output plate;
 an inner peripheral side damper part for transmitting the torque to the output plate, the inner peripheral side damper part including at least two inner peripheral side springs, the at least two inner peripheral side springs disposed in a circumferential alignment on an inner peripheral side of the outer peripheral side damper part, the at least two inner peripheral side springs for acting in series with each other;
 an intermediate member rotatable relative to the input plate and the output plate, the intermediate member for making the outer peripheral side damper part and the inner peripheral side damper part act in series with each other; and a float member disposed axially between the first output plate and the second output plate.

2. The lock-up device according to claim 1, wherein the float member is rotatable relative to the input plate, the output plate and the intermediate member, the float member for making at least two of the inner peripheral side springs act in series with each other.

3. The lock-up device according to claim 1, wherein the at least two outer peripheral side springs have different magnitudes of stiffness.

4. The lock-up device according to claim 3, wherein among the at least two outer peripheral side springs, at least one outer peripheral side spring with a lowest stiffness is compressed such that windings thereof are closely contacted to each other when a relative rotational angle between the input plate and the output plate is greater than or equal to a predetermined angle.

5. The lock-up device according to claim 1, wherein each of the at least two inner peripheral side springs takes a straight shape in a free state thereof.

6. The lock-up device according to claim 1, further comprising:

a stopper mechanism for restricting a relative rotational angle between the input plate and the output plate.

7. The lock-up device according to claim 6, wherein the stopper mechanism includes a pawl provided on one of the input plate and the output plate, and an opening into which the pawl is inserted, the opening circumferentially provided in the other of the input plate and the output plate.

8. The lock-up device according to claim 1, wherein the at least two outer peripheral side springs before assembly take a circular-arc shape on which no external force acts.

* * * * *